United States Patent
Lin et al.

(10) Patent No.: US 9,652,603 B1
(45) Date of Patent: May 16, 2017

(54) FINGERPRINT IDENTIFICATION DEVICE

(71) Applicant: KEYCORE TECHNOLOGY CORP., Zhubei, Hsinchu County (TW)

(72) Inventors: Wei-Cheng Lin, Zhudong Township, Hsinchu County (TW); Chien-Jen Hsiao, Zhudong Township, Hsinchu County (TW); Shih-Hsiu Tseng, Zhudong Township, Hsinchu County (TW)

(73) Assignee: Keycore Technology Corp., Zhubei (TW)

( * ) Notice: Subject to any disclaimer, the term of this patent is extended or adjusted under 35 U.S.C. 154(b) by 0 days.

(21) Appl. No.: 14/965,903

(22) Filed: Dec. 11, 2015

(51) Int. Cl.
*G06K 9/00* (2006.01)
*G06F 21/32* (2013.01)

(52) U.S. Cl.
CPC ......... *G06F 21/32* (2013.01); *G06K 9/00053* (2013.01); *G06K 9/00087* (2013.01)

(58) Field of Classification Search
CPC ............. G06K 9/0002; G06K 9/00026; G06K 9/00013; G06K 9/00033; G06F 3/041
See application file for complete search history.

(56) References Cited

U.S. PATENT DOCUMENTS

| | | | | |
|---|---|---|---|---|
| 6,647,133 B1* | 11/2003 | Morita | ............... | G06K 9/00013 340/562 |
| 6,694,269 B2* | 2/2004 | Hayes | ................ | G06K 9/0002 382/108 |
| 9,547,787 B2* | 1/2017 | Wang | ................ | G06K 9/0002 |
| 2004/0185590 A1* | 9/2004 | Miyai | ............... | G06K 9/00053 438/48 |
| 2012/0105081 A1* | 5/2012 | Shaikh | ................ | G06K 9/0002 324/686 |
| 2015/0082890 A1* | 3/2015 | Pant | ..................... | G01N 29/265 73/618 |
| 2015/0371076 A1* | 12/2015 | Lee | ........................ | G06F 3/041 382/124 |
| 2016/0171273 A1* | 6/2016 | Ho | ........................ | G06K 9/0002 324/658 |
| 2016/0188032 A1* | 6/2016 | Lin | ........................ | G06K 9/0002 345/174 |
| 2016/0224142 A1* | 8/2016 | Yang | .................. | G06K 9/00006 |

\* cited by examiner

*Primary Examiner* — Amir Alavi
(74) *Attorney, Agent, or Firm* — C. G. Mersereau; Nikolai & Mersereau, P.A.

(57) ABSTRACT

A fingerprint identification device is directly integrated with and formed on a touch panel, a color filter (CF), a thin-film transistor (TFT) or a liquid crystal module (LCM). The fingerprint identification device improves the shortcoming of the conventional fingerprint identification device that it is necessary to first manufacture the fingerprint identification device on a silicon wafer and then integrate the fingerprint identification device with another component. Moreover, the fingerprint identification device has much higher fingerprint identification precision.

12 Claims, 6 Drawing Sheets

FINGERPRINT IDENTIFICATION DEVICE

BACKGROUND OF THE INVENTION

1. Field of the Invention

The present invention relates generally to a fingerprint identification device, and more particularly to a fingerprint identification device, which is directly integrated with and formed on a touch panel, a color filter (CF), a thin-film transistor (TFT) or a liquid crystal module (LCM) to enhance the fingerprint identification precision.

2. Description of the Related Art

Along with the rapid advance of multimedia technique, more and more easy portable intelligent electronic devices have been developed and become inevitable implements in our daily life, such as personal digital assistant (PDA), digital camera, personal notebook, tablet or wearable device. These portable electronic devices are quite personalized. Therefore, in case a user misses the portable electronic devices or the portable electronic devices are burglarized, all the data stored in the portable electronic devices, such as telephone book, photos, etc. may be utilized by unauthorized persons to cause unnecessary loss.

Therefore, such product necessitates a certain identity certification and authorization management to ensure the privacy of a user. The currently used identity certification means is mainly password protection. A user needs to first input correct password to the portable electronic device for access to the operation page of the portable electronic device. However, the security of the password protection is lower. This is because the password is likely to leak or break. Moreover, in case the user forgets the password, it will be quite troublesome. Therefore, portable electronic devices with fingerprint identification function for identity certification have been developed and commercially available. Human fingerprints are unique so that the security of the identity certification by fingerprint identification is much higher. In addition, the fingerprint identification for identity certification is relatively convenient to a user. The user can save the troubles of memorization and input of the password.

The existent fingerprint identification system is wisely applied to handheld device or mobile device. The most often seen fingerprint identification device is independently fixedly designed on one side of the keyboard of such as a notebook or a backside or bottom side of one end of the handheld mobile device in a fixed position. The fingerprint identification device can be hardly integrated on the touch screen of the handheld mobile device to minify the volume of the handheld mobile device. Furthermore, the conventional fingerprint identification chip packaging module mainly includes a substrate, chips and packaging body. The chips are disposed on the substrate and electrically connected therewith. The packaging body is overlaid on the surface of the substrate and the chips.

In the conventional technique, it is necessary to first arrange the respective sensation circuits and metal wires or a chip on a substrate made of silicon wafer. These components are integrated to form a fingerprint identification device. Then, the fingerprint identification device is connected with the touch panel or other device for use. The total thickness of the conventional fingerprint identification device is relatively thick. As a result, the thickness will affect the precision of fingerprint identification. Also, in consideration of the thickness, the fingerprint identification device cannot be integrated with the touch device with thinner thickness.

Furthermore, the chip is coated with multiple layers of films so that the total thickness of the chip packaging module is thicker. Therefore, in general, when a finger touches the sensation section of the chip, the sensitivity of the chip packaging module is lowered.

In addition, the conventional slide-type fingerprint identification system has directionality. Moreover, the identification time is too long. Also, the conventional slide-type fingerprint identification system must be independently arranged. Therefore, the conventional slide-type fingerprint identification system can be hardly integrated with the touch screen and it is inconvenient to use such fingerprint identification system.

SUMMARY OF THE INVENTION

It is therefore a primary object of the present invention to provide a fingerprint identification device, which is directly integrated with and formed on a touch panel, a color filter (CF), a thin-film transistor (TFT) or a liquid crystal module (LCM) as an integrated body.

To achieve the above and other objects, the fingerprint identification device of the present invention is formed on a substrate section.

The substrate section has an upper side and a lower side. The fingerprint identification device is selectively disposed on the upper side or the lower side of the substrate section.

The fingerprint identification device includes a photoresist layer, a first coating layer, a first fingerprint identification electrode layer, a first protection layer, a second fingerprint identification electrode layer, a second protection layer, a lead layer and a flexible circuit board.

The photoresist layer is selectively disposed on the upper side or the lower side of the substrate section. The first coating layer is disposed on one face of the photoresist layer distal from the substrate section. The first fingerprint identification electrode layer is disposed on one face of the first coating layer distal from the photoresist layer. The first fingerprint identification electrode layer has multiple first fingerprint identification electrodes. The first protection layer is overlaid on a part of the first fingerprint identification electrode layer. The second fingerprint identification electrode layer is disposed on one face of the first protection layer distal from the first fingerprint identification electrode layer. The second fingerprint identification electrode layer has multiple second fingerprint identification electrodes. The second protection layer is overlaid on a part of the second fingerprint identification electrode layer. The lead layer has multiple metal leads. The metal leads are selectively electrically connected with the first and second fingerprint identification electrode layers. The flexible circuit board is electrically connected with the first and second fingerprint identification electrode layers and the lead layer.

The fingerprint identification device of the present invention is directly integrated with and manufactured on a touch panel, a color filter (CF), a thin-film transistor (TFT), a liquid crystal module (LCM) or a glass substrate. The entire display device can be more flexibly designed and the thickness of the fingerprint identification device is reduced so that the fingerprint identification precision is enhanced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
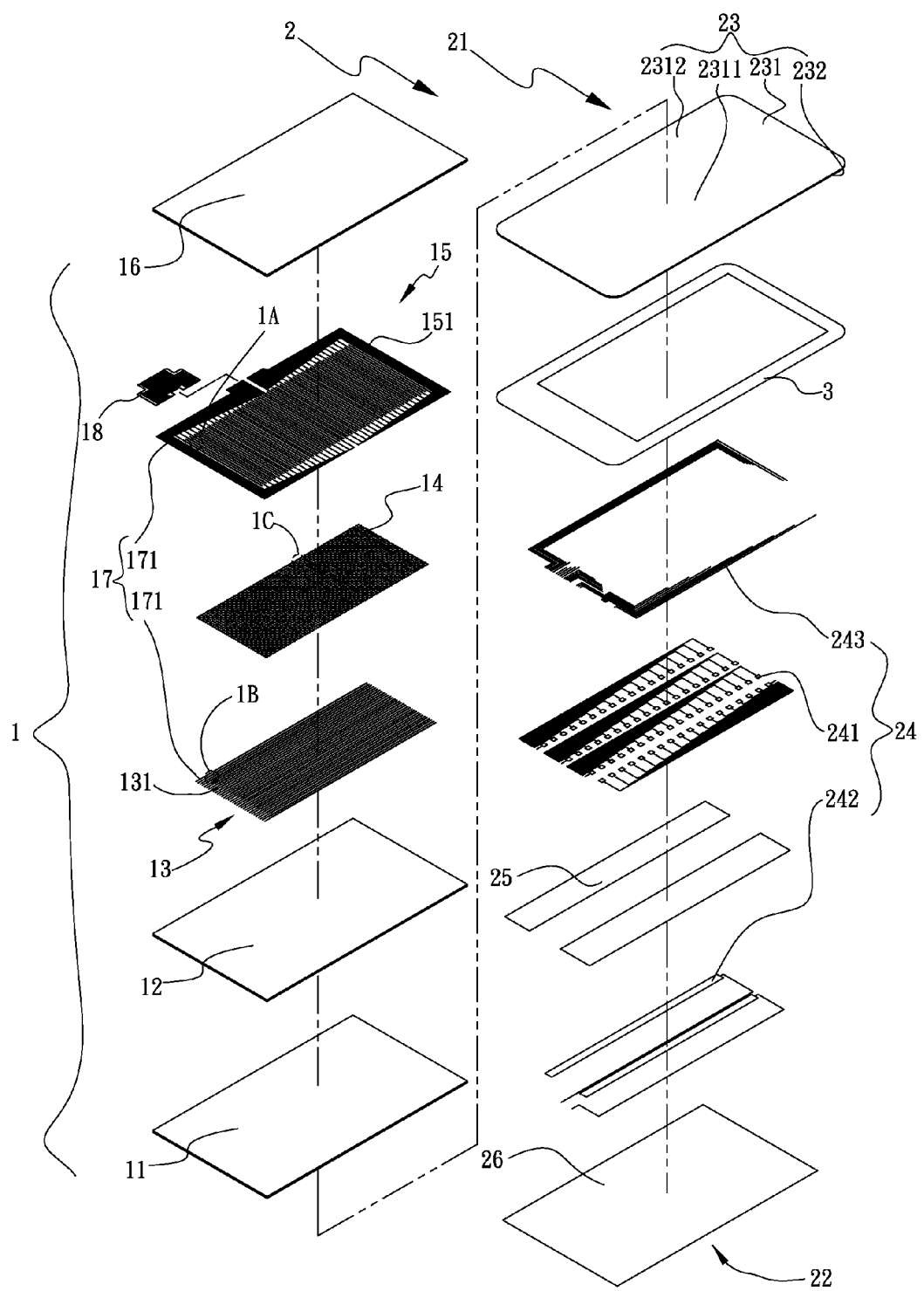
FIG. 1 is a perspective exploded view of a first embodiment of the fingerprint identification device of the present invention.
Figure 1A:
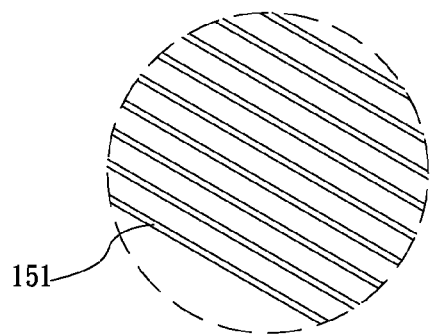
FIG. 1A is an enlarged view of a part of the first embodiment of the fingerprint identification device of the present invention.
Figure 1B:
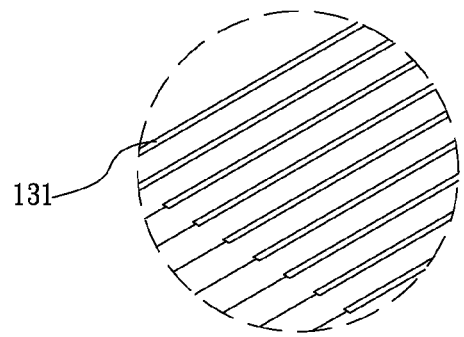
FIG. 1B is an enlarged view of another part of the first embodiment of the fingerprint identification device of the present invention.
Figure 1C:
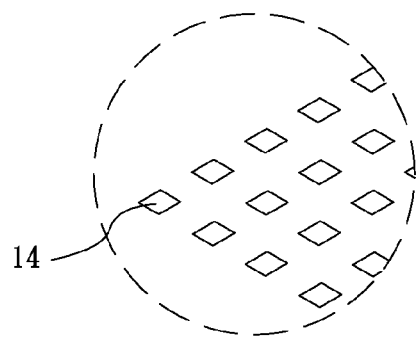
FIG. 1C is an enlarged view of still another part of the first embodiment of the fingerprint identification device of the present invention.
Figure 2:
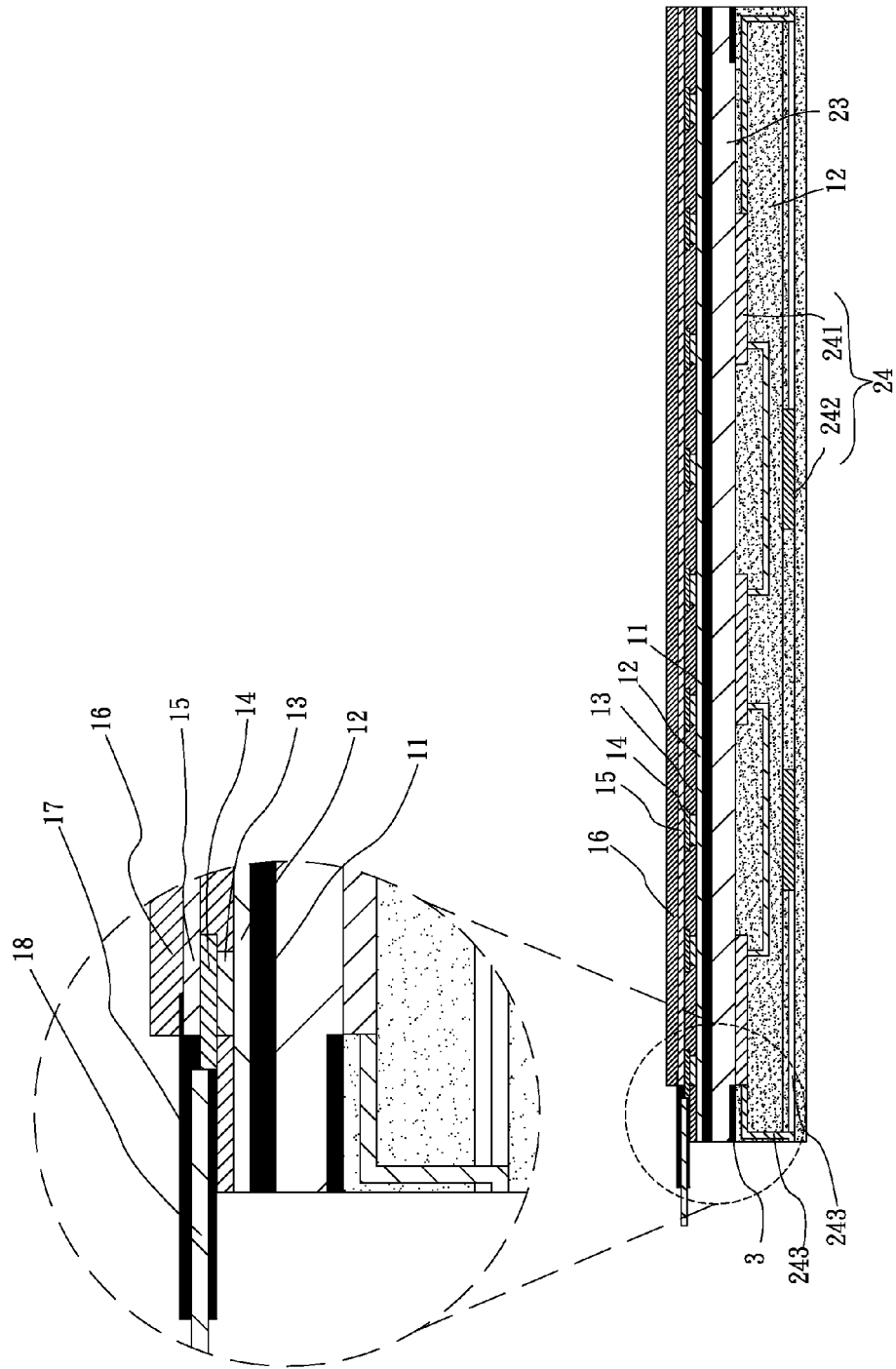
FIG. 2 is a sectional assembled view of the first embodiment of the fingerprint identification device of the present invention.

Please refer to FIGS. 1, 1A, 1B, 1C and 2. FIG. 1 is a perspective exploded view of a first embodiment of the fingerprint identification device of the present invention. FIG. 1A is an enlarged view of a part of the first embodiment of the fingerprint identification device of the present invention. FIG. 1B is an enlarged view of another part of the first embodiment of the fingerprint identification device of the present invention. FIG. 1C is an enlarged view of still another part of the first embodiment of the fingerprint identification device of the present invention. FIG. 2 is a sectional assembled view of the first embodiment of the fingerprint identification device of the present invention. As shown in the drawings, the fingerprint identification device 1 of the present invention is formed on a substrate section 2. The substrate section 2 is selected from a group consisting of a color filter (CF), a thin-film transistor (TFT), a liquid crystal module (LCM) and a touch panel.

The substrate section 2 has an upper side 21 and a lower side 22. In this embodiment, the substrate section 2 is, but not limited to, a touch panel for illustration purposes only. The fingerprint identification device 1 is selectively disposed on the upper side 21 or the lower side 22. The touch panel (the substrate section 2) includes a glass substrate 23, a touch electrode layer 24, a first insulation layer 25, a second insulation layer 26 and a shield layer 3.

The glass substrate 23 has a first surface 231 and a second surface 232. The first surface 231 is defined with a touch section 2311 and a non-touch section 2312 in adjacency to the touch section 2311. The shield layer 3 is selectively disposed on the non-touch section 2312 of the first surface 231 or the second surface 232. The touch electrode layer 24 is disposed on the touch section 2311 of the second surface 232 of the glass substrate 23. The touch electrode layer 24 has multiple first touch electrodes 241 and multiple second touch electrodes 242 and multiple metal wires 243. The first and second touch electrodes 241, 242 are selectively electrically connected with the metal wires 243. The first insulation layer 25 is overlaid on the intersections of the first and second touch electrodes 241, 242. The second insulation layer 26 is overlaid on the touch electrode layer 24 and the first insulation layer 25.

The fingerprint identification device 1 has a photoresist layer 11, a first coating layer 12, a first fingerprint identification electrode layer 13, a first protection layer 14, a second fingerprint identification electrode layer 15, a second protection layer 16, a lead layer 17 and a flexible circuit board 18.

The substrate section 2 has an upper side 21 and a lower side 22. The substrate section 2 is selected from a group consisting of a color filter (CF), a thin-film transistor (TFT), a liquid crystal module (LCM) and a touch panel. In this embodiment, the substrate section 2 is, but not limited to, a touch panel for illustration purposes only.

The photoresist layer 11 is selectively disposed on the upper side 21 or the lower side 22 of the substrate section 2. In this embodiment, the photoresist layer 11 is, but not limited to, disposed on the upper side 21 (the first surface 231 of the glass substrate 23) for illustration purposes only. The first coating layer 12 is disposed on one face of the photoresist layer 11 distal from the substrate section 2.

The first fingerprint identification electrode layer 13 is disposed on one face of the first coating layer 12 distal from the photoresist layer 11. The first fingerprint identification electrode layer 13 has multiple first fingerprint identification electrodes 131. The first protection layer 14 is overlaid on a part of the first fingerprint identification electrode layer 13. The first fingerprint identification electrode layer 13 is partially exposed to outer side of the first protection layer 14.

The second fingerprint identification electrode layer 15 is disposed on one face of the first protection layer 14 distal from the first fingerprint identification electrode layer 13. The second fingerprint identification electrode layer 15 has multiple second fingerprint identification electrodes 151. The second protection layer 16 is overlaid on a part of the second fingerprint identification electrode layer 15. The second fingerprint identification electrode layer 15 is partially exposed to outer side of the second protection layer 16.

The lead layer 17 has multiple metal leads 171. The metal leads 171 are selectively electrically connected with the first and second fingerprint identification electrode layers 13, 15.

The flexible circuit board 18 is electrically connected with the first and second fingerprint identification electrode layers 13, 15 and the lead layer 17. The flexible circuit board 18 is electrically connected with the parts of the first and second fingerprint identification electrode layers 13, 15 that are not covered by the first and second protection layers 14, 16 and the part of the lead layer 17 that is not covered.

The first protection layer 14 is interposed between the first and second fingerprint identification electrode layers 13, 15 to provide insulation effect. The first fingerprint identification electrodes 131 are connected by way of bridging. The second fingerprint identification electrodes 151 are connected by way of bridging.

The present invention is mainly for improving the shortcoming of the conventional fingerprint identification device that it is necessary to first independently manufacture the fingerprint identification device on a silicon wafer and then integrate the fingerprint identification device with the touch panel or other device to provide fingerprint identification function.

Figure 3:
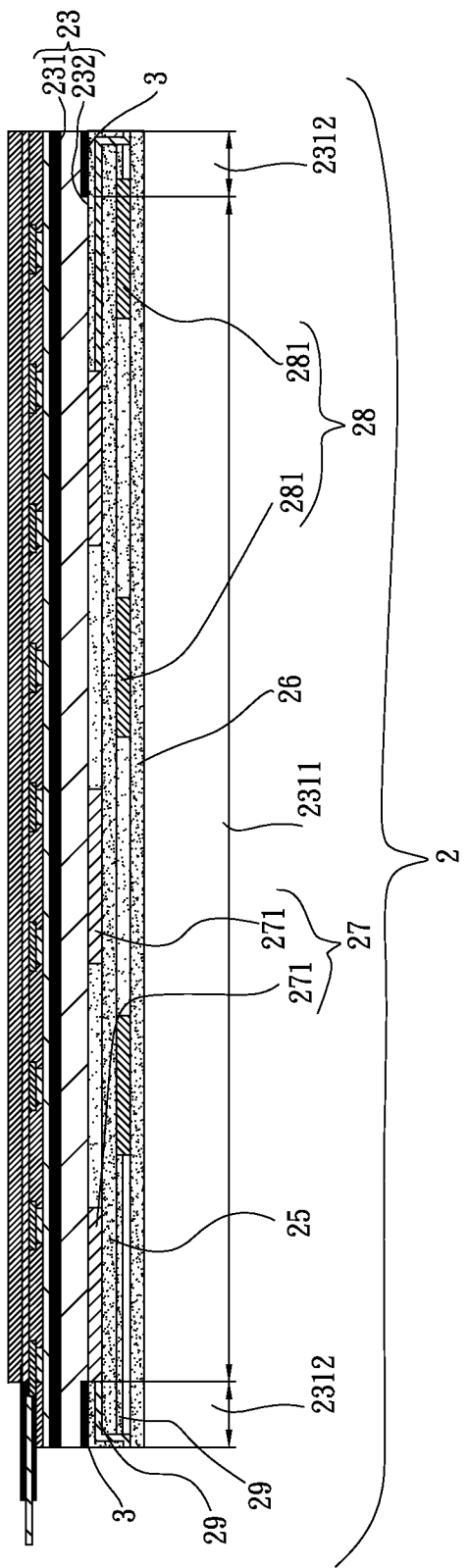
FIG. 3 is a sectional assembled view of a second embodiment of the fingerprint identification device of the present invention.

Please now refer to FIG. 3, which is a sectional assembled view of a second embodiment of the fingerprint identification device of the present invention. The second embodiment is partially identical to the first embodiment in structure and technical characteristic and thus will not be repeatedly described. The second embodiment is different from the first embodiment in that the touch panel (the substrate section 2) includes a glass substrate 23, a first touch electrode layer 27, a first insulation layer 25, a second touch electrode layer 28, a second insulation layer 26, a metal wire layer 29 and a shield layer 3.

The glass substrate 23 has a first surface 231 and a second surface 232. The first surface 231 is defined with a touch section 2311 and a non-touch section 2312 in adjacency to the touch section 2311. The shield layer 3 is selectively disposed on the non-touch section 2312 of the first surface 231 or the second surface 232. The first touch electrode layer 27 is disposed on the second surface 232 of the glass substrate 23. The first touch electrode layer 27 has multiple first touch electrodes 271. The first insulation layer 25 is overlaid on the first touch electrode layer 27. The second touch electrode layer 28 is disposed on one face of the first insulation layer 25 distal from the first touch electrode layer 27. The second touch electrode layer 28 has multiple second touch electrodes 281. The second insulation layer 26 is overlaid on the second touch electrode layer 28. The metal wire layer 29 is selectively electrically connected with the first and second touch electrode layers 27, 28.

The first coating layer 12 of the first and second embodiments is a silicon dioxide film. The silicon dioxide film serves to enhance the adhesion of the respective layers of the entire structure when deposited. The first and second fingerprint identification electrodes 131, 151 have a geometrical form selected from a group consisting of circular form, rectangular form, triangular form and trapezoidal form. The photoresist layer 11 is white, black or transparent. The photoresist layer 11 is a high-temperature-resistant ink at least capable of bearing a high temperature ranging from 260 degrees to 300 degrees. The first and second protection layers are over coat (OC) protection films or silicon dioxide ($SiO_2$) films.

Figure 4:
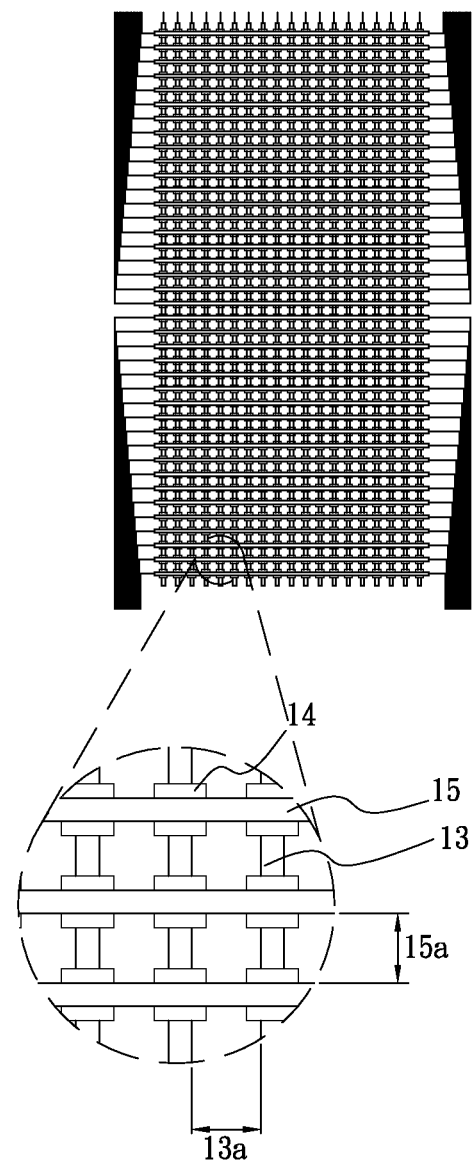
FIG. 4 is a plane view of the first and second fingerprint identification electrodes of the fingerprint identification device of the present invention.

Please now refer to FIG. 4, which is a plane view of the first and second fingerprint identification electrodes of the fingerprint identification device of the present invention. As shown in the drawing, the first fingerprint identification electrodes 131 are connected with each other. The second fingerprint identification electrodes 151 are also connected with each other. The first and second fingerprint identification electrodes 131, 151 have an area ranging from 20 $\mu m^2$ to 50 $\mu m^2$. The first fingerprint identification electrodes 131 extend in a longitudinal direction (with reference to the substrate section 2 of FIG. 1). The intervals 13a between the first fingerprint identification electrodes 131 range from 10 $\mu m$ to 40 $\mu m$, and preferably 38 $\mu m$. The second fingerprint identification electrodes 151 extend in a transverse direction (with reference to the substrate section 2 of FIG. 1). The intervals 15a between the second fingerprint identification electrodes 151 range from 10 $\mu m$ to 40 $\mu m$, and preferably 38 $\mu m$. The first and second fingerprint identification electrodes 131, 151 are transparent electrodes.

Figure 5:
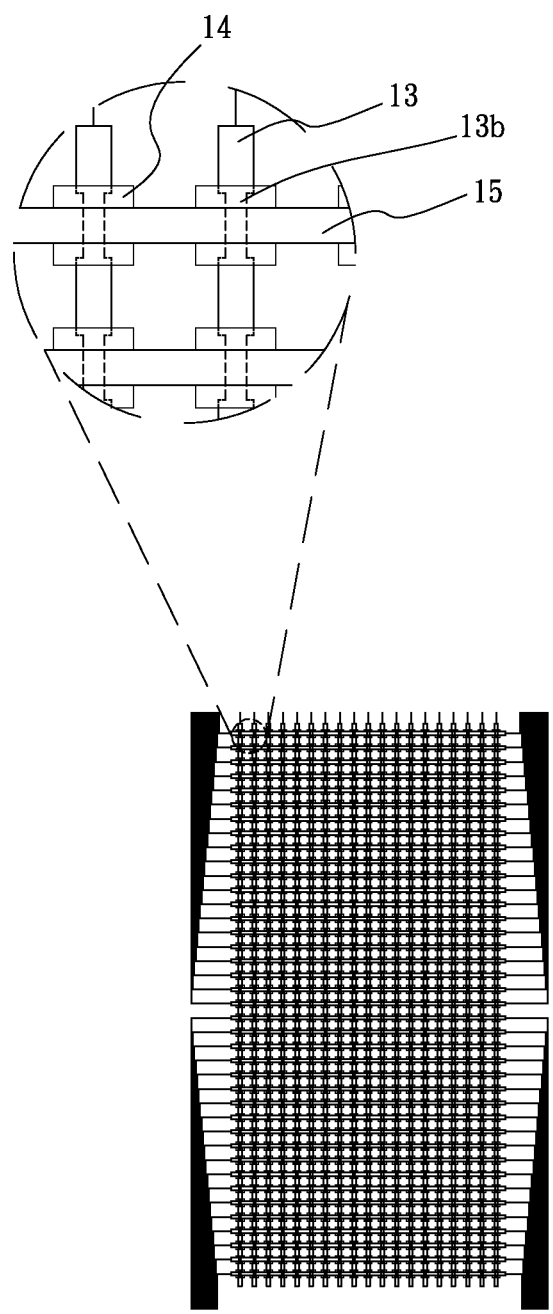
FIG. 5 is another plane view of the first and second fingerprint identification electrodes of the fingerprint identification device of the present invention.

Please now refer to FIG. 5, which is another plane view of the first and second fingerprint identification electrodes of the fingerprint identification device of the present invention. As shown in the drawing, the transverse width of the first fingerprint identification electrodes 13 ranges from 10 $\mu m$ to 30 $\mu m$. The longitudinal width of the second fingerprint identification electrodes 15 ranges from 10 $\mu m$ to 30 $\mu m$. The transverse width 13b of the sections of the first fingerprint identification electrodes 13, at which sections the second fingerprint identification electrodes 15 intersect the first fingerprint identification electrodes 13 is 10 $\mu m$.

The fingerprint identification device 1 of the present invention is directly manufactured and integrated on the touch panel or the component of other display device to thin the total thickness of the fingerprint identification device. Moreover, the silicon substrate serving as a substrate material is saved. Therefore, the capacitance sensation amount is enhanced to promote the fingerprint identification precision.

According to the fingerprint identification device 1 of the present invention, a photoresist layer is first deposited on a section or a plane face of the touch panel (the substrate section 2), on which the fingerprint identification device 1 is to be disposed by means of printing or sputtering or coating. Then, a layer of silicon dioxide film is deposited by means of sputtering or coating to form the first coating layer 12 for enhancing the adhesion ratio. Then, a film of the material usable as the fingerprint identification sensation electrodes is deposited on the first coating layer 12. Then, by means of lithography, the first fingerprint identification electrodes 131 are fully laid on the first coating layer 12 to form multiple metal leads 171 partially electrically connected with the first fingerprint identification electrodes 131. Then, a first protection layer 14 (over coat protection film) is deposited and overlaid on the formed first fingerprint identification electrodes 131 to achieve insulation effect. Then, a film of the material usable as the fingerprint identification sensation electrodes is further deposited on the first protection layer 14. Then, by means of lithography, the second fingerprint identification electrodes 151 are fully laid on the first protection layer 14 to form multiple metal leads 171 partially electrically connected with the second fingerprint identification electrodes 151. Finally, a second protection layer 16 (over coat protection film) is further deposited and overlaid on the formed second fingerprint identification electrodes 151 and the metal leads 171 to achieve packaging and insulation effect. Some parts of the first and second fingerprint identification electrodes 131, 151 are not covered by the first and second protection layers 14, 16 so that these parts can be electrically connected with the flexible circuit board.

The fingerprint identification device 1 of the present invention can be disposed in any desired position without using the silicon wafer as a substrate material. Therefore, the manufacturing cost is greatly lowered. Also, the fingerprint identification device 1 is thinned to shorten the intervals between the sensation electrodes. Therefore, the fingerprint identification precision is promoted.

The present invention has been described with the above embodiments thereof and it is understood that many changes and modifications in the above embodiments can be carried out without departing from the scope and the spirit of the invention that is intended to be limited only by the appended claims.

What is claimed is:

1. A fingerprint identification device formed on a substrate section, the substrate section having an upper side and a lower side, the fingerprint identification device comprising:
   a photoresist layer selectively disposed on the upper side or the lower side of the substrate section;
   a first coating layer disposed on one face of the photoresist layer distal from the substrate section;
   a first fingerprint identification electrode layer disposed on one face of the first coating layer distal from the photoresist layer, the first fingerprint identification electrode layer having multiple first fingerprint identification electrodes;

a first protection layer overlaid on a part of the first fingerprint identification electrode layer;

a second fingerprint identification electrode layer disposed on one face of the first protection layer distal from the first fingerprint identification electrode layer, the second fingerprint identification electrode layer having multiple second fingerprint identification electrodes;

a second protection layer overlaid on a part of the second fingerprint identification electrode layer;

a lead layer having multiple metal leads, the metal leads being selectively electrically connected with the first and second fingerprint identification electrode layers; and a flexible circuit board electrically connected with the first and second fingerprint identification electrode layers and the lead layer.

2. The fingerprint identification device as claimed in claim 1, wherein the substrate section is a touch panel including:

a glass substrate having a first surface and a second surface, the first surface being defined with a touch section and a non-touch section in adjacency to the touch section;

a shield layer selectively disposed on the non-touch section of the first surface or the second surface;

a touch electrode layer disposed on the second surface of the glass substrate, the touch electrode layer having multiple first touch electrodes and multiple second touch electrodes and multiple metal wires, the first and second touch electrodes being selectively electrically connected with the metal wires;

a first insulation layer overlaid on the intersections of the first and second touch electrodes; and a second insulation layer overlaid on the touch electrode layer and the first insulation layer.

3. The fingerprint identification device as claimed in claim 1, wherein the substrate section is a touch panel including:

a glass substrate having a first surface and a second surface, the first surface being defined with a touch section and a non-touch section in adjacency to the touch section;

a shield layer selectively disposed on the non-touch section of the first surface or the second surface;

a first touch electrode layer disposed on the second surface of the glass substrate, the first touch electrode layer having multiple first touch electrodes;

a first insulation layer overlaid on first touch electrode layer;

a second touch electrode layer disposed on one face of the first insulation layer distal from the first touch electrode layer, the second touch electrode layer having multiple second touch electrodes;

a second insulation layer overlaid on the second touch electrode layer; and a metal wire layer selectively electrically connected with the first and second touch electrode layers.

4. The fingerprint identification device as claimed in claim 1, wherein the first coating layer is a silicon dioxide film.

5. The fingerprint identification device as claimed in claim 1, wherein the first and second fingerprint identification electrodes have a geometrical form selected from a group consisting of circular form, rectangular form, triangular form and trapezoidal form, the first and second fingerprint identification electrodes having an area ranging from 20 $\mu m^2$ to 50 $\mu m^2$.

6. The fingerprint identification device as claimed in claim 1, wherein the intervals between the first fingerprint identification electrodes range from 10 µm to 40 µm, and preferably 38 µm and the intervals between the second fingerprint identification electrodes range from 10 µm to 40 µm, and preferably 38 µm.

7. The fingerprint identification device as claimed in claim 1, wherein the first and second fingerprint identification electrodes are transparent electrodes.

8. The fingerprint identification device as claimed in claim 1, wherein the substrate section is selected from a group consisting of a color filter (CF), a thin-film transistor (TFT) and a liquid crystal module (LCM).

9. The fingerprint identification device as claimed in claim 1, wherein the transverse width of the first fingerprint identification electrodes ranges from 10 µm to 30 µm and the longitudinal width of the second fingerprint identification electrodes ranges from 10 µm to 30 µm.

10. The fingerprint identification device as claimed in claim 9, wherein the transverse width of the sections of the first fingerprint identification electrodes, at which sections the second fingerprint identification electrodes intersect the first fingerprint identification electrodes is 10 µm.

11. The fingerprint identification device as claimed in claim 1, wherein the photoresist layer is white, black or transparent and the photoresist layer is a high-temperature-resistant ink at least capable of bearing a high temperature ranging from 260 degrees to 300 degrees.

12. The fingerprint identification device as claimed in claim 1, wherein the first and second protection layers are over coat (OC) protection films or silicon dioxide ($SiO_2$) films.

* * * * *